United States Patent [19]

Takamori

[11] Patent Number: 5,063,606
[45] Date of Patent: Nov. 5, 1991

[54] METHOD OF AND DEVICE FOR DETECTING AN IMAGE AREA IN AN IMAGE PROCESSOR

[75] Inventor: Tetsuya Takamori, Kanagawa, Japan

[73] Assignee: Fuji Photo Film Co., Ltd., Kanagawa, Japan

[21] Appl. No.: 398,560

[22] Filed: Aug. 25, 1989

[30] Foreign Application Priority Data

Aug. 26, 1988 [JP] Japan .................................. 63-210800

[51] Int. Cl.$^5$ .......................... G06K 9/20; G06K 9/48; G06K 9/00
[52] U.S. Cl. ........................................ 382/48; 382/22; 382/63; 358/464; 358/453
[58] Field of Search ....................... 382/63, 22, 62, 23, 382/48; 358/464, 453, 487

[56] References Cited

U.S. PATENT DOCUMENTS

| | | | |
|---|---|---|---|
| 4,034,341 | 7/1977 | Isono et al. | 382/63 |
| 4,656,525 | 4/1987 | Norris | 358/487 |
| 4,807,041 | 2/1989 | Kishi et al. | 358/487 |
| 4,823,395 | 4/1989 | Chikauchi | 382/63 |
| 4,833,722 | 5/1989 | Morton et al. | 358/464 |

FOREIGN PATENT DOCUMENTS 1222657  2/1971  United Kingdom .................. 382/63

*Primary Examiner*—David K. Moore
*Assistant Examiner*—Michael R. Cammarata
*Attorney, Agent, or Firm*—Sughrue, Mion, Zinn, Macpeak & Seas

[57] ABSTRACT

A method of detecting a designated image area from plural image areas included in a frame of a microfilm which is read by an image sensor through scanning operation. The method includes the steps of detecting plural image areas included in the frame, extracting the image area which contains a pre-set position in the frame, and then obtaining and storing the addresses which define the periphery of the designated image area. Also provided is an image area detecting device which comprises an image area detecting circuit for detecting plural image areas contained in the frame, a latch circuit for determining the designated image area including a pre-set position in the frame, memory for storing the addresses of the periphery of the designated image area, and a mask for extracting the designated image area defined by the thus stored addresses.

6 Claims, 6 Drawing Sheets

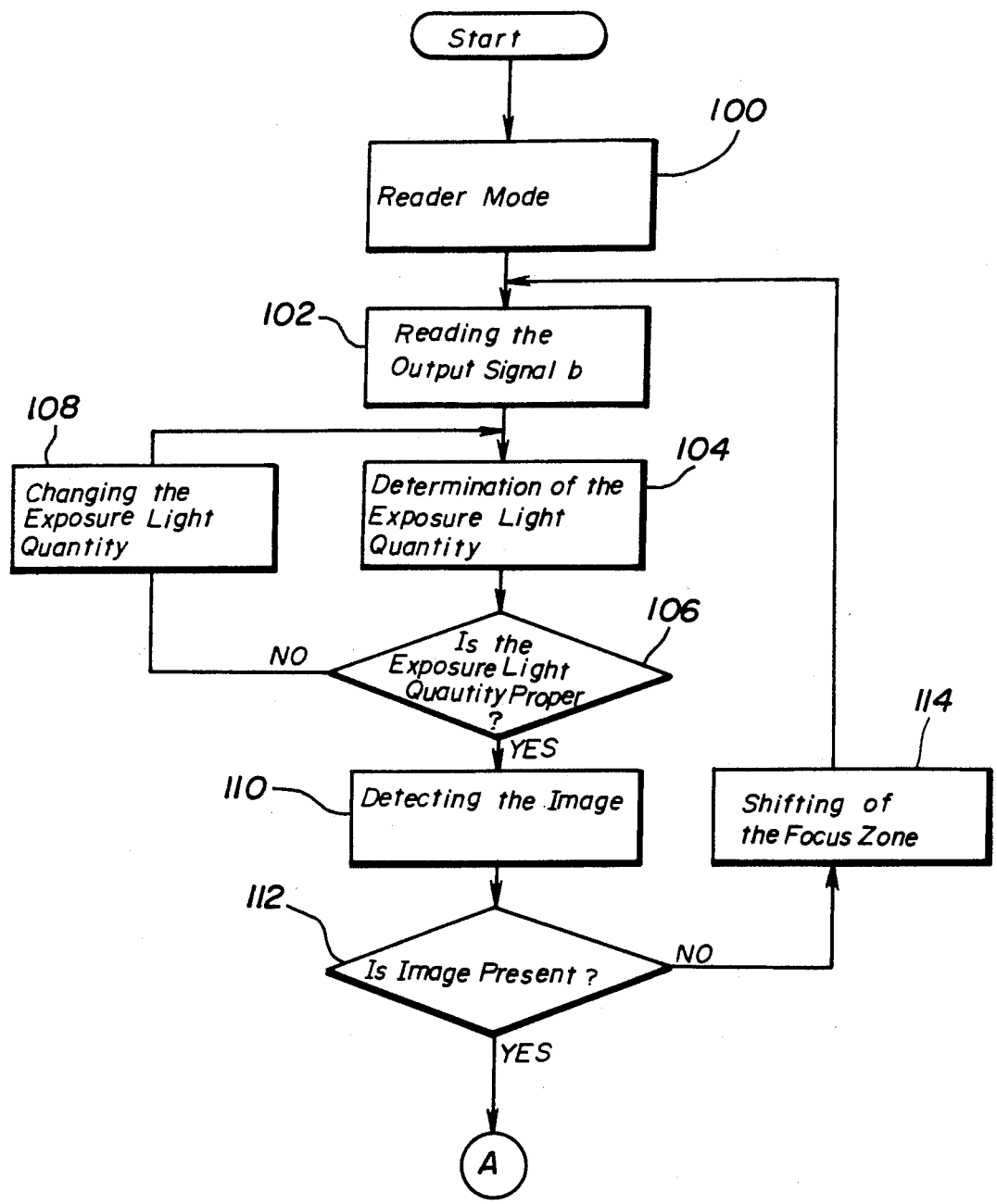

METHOD OF AND DEVICE FOR DETECTING AN IMAGE AREA IN AN IMAGE PROCESSOR

BACKGROUND OF THE INVENTION

1. Field of the Invention

The present invention relates generally to an image processor for reading an image on a frame of a microfilm using an image sensor, such as a CCD line sensor, and particularly to a method of and device for selectively detecting the image area to remove the unnecessary marginal portions surrounding the image area and to detect only the designated image area.

2. Related Art Statement

There is known a microfilm reader by which an image in a frame of a microfilm is read by an image sensor and the output signal is binarized while referring to a pre-set binary level to obtain image signals. Since each frame of the microfilm has marginal portions in which no image is present, these marginal portions are read by the image sensor together with the image area in each frame. As a result, black marginal portions surround the image area when the output signal are printed out.

In order to erase such black marginal portions, various approaches have been proposed. For example, addresses defining the image area in co-ordinates are input through a keyboard or the movable marks. However, such input operations are generally troublesome and time-consuming operations.

Another approach is to discriminate the image area from the marginal portions by referring to the level of the output image signals. However, such an approach involves the problem that blip marks or like marks are erroneously detected as though they constitute the portions of the image.

OBJECTS AND SUMMARY OF THE INVENTION

A first object of this invention is to provide a method of selectively detecting an image area to remove the unnecessary marginal portions surrounding the image area and to detect only the designated image area while eliminating blip marks or other unnecessary marks with a simple operation.

A second object of this invention is to provide a image area detecting device used for realizing the selective detection of the image area.

According to the present invention, the first object is achieved by the provision of a method of detecting a designated image area from plural image areas included in a frame of a microfilm which is read by an image sensor through scanning operations, comprising the steps of detecting plural image areas included in the frame, extracting the designated image area which contains a pre-set position in the frame, and then obtaining and storing the addresses which define the periphery of the designated image area.

The second object of this invention is achieved by the provision of an image processor for reading an image in a frame of a microfilm through scanning operations and having an image area detecting device, said image area detecting device comprising an image area detecting circuit for detecting plural image areas contained in the frame, a latch circuit for determining the designated image area including a pre-set position in the frame, memory means for storing the addresses of the periphery of the designated image area, and mask means for extracting the designated image area defined by said addresses.

BRIEF DESCRIPTION OF THE DRAWINGS

FIGS. 6A and 6B are flow charts showing the operation sequence.

DESCRIPTION OF PREFERRED EMBODIMENT

The present invention will be described in detail while referring to a presently preferred embodiment thereof shown in FIGS. 1 to 6.

Figure 1:
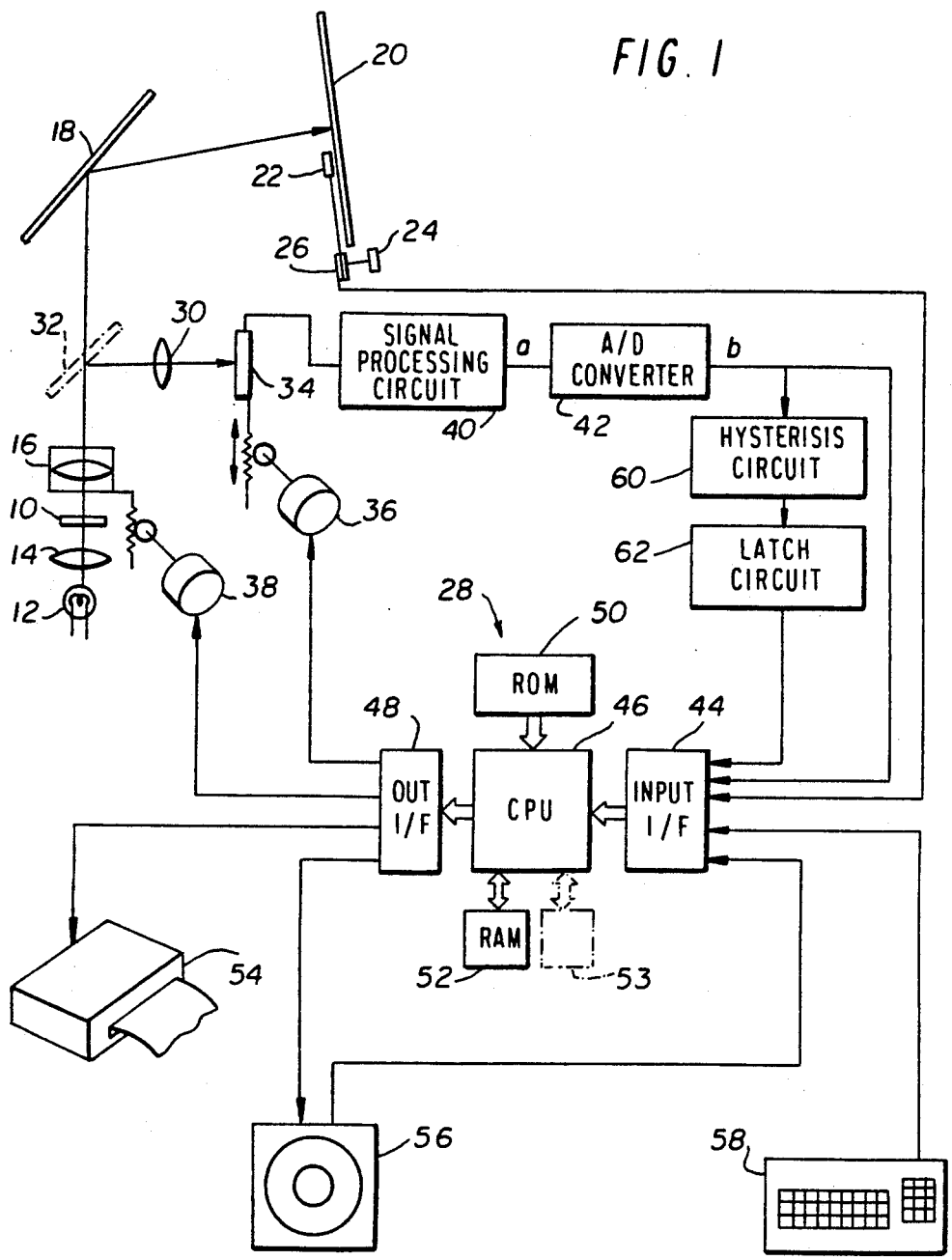
FIG. 1 is a schematic illustration showing the general construction of a digital microfilm reader-printer embodying the present invention.
Figure 2:
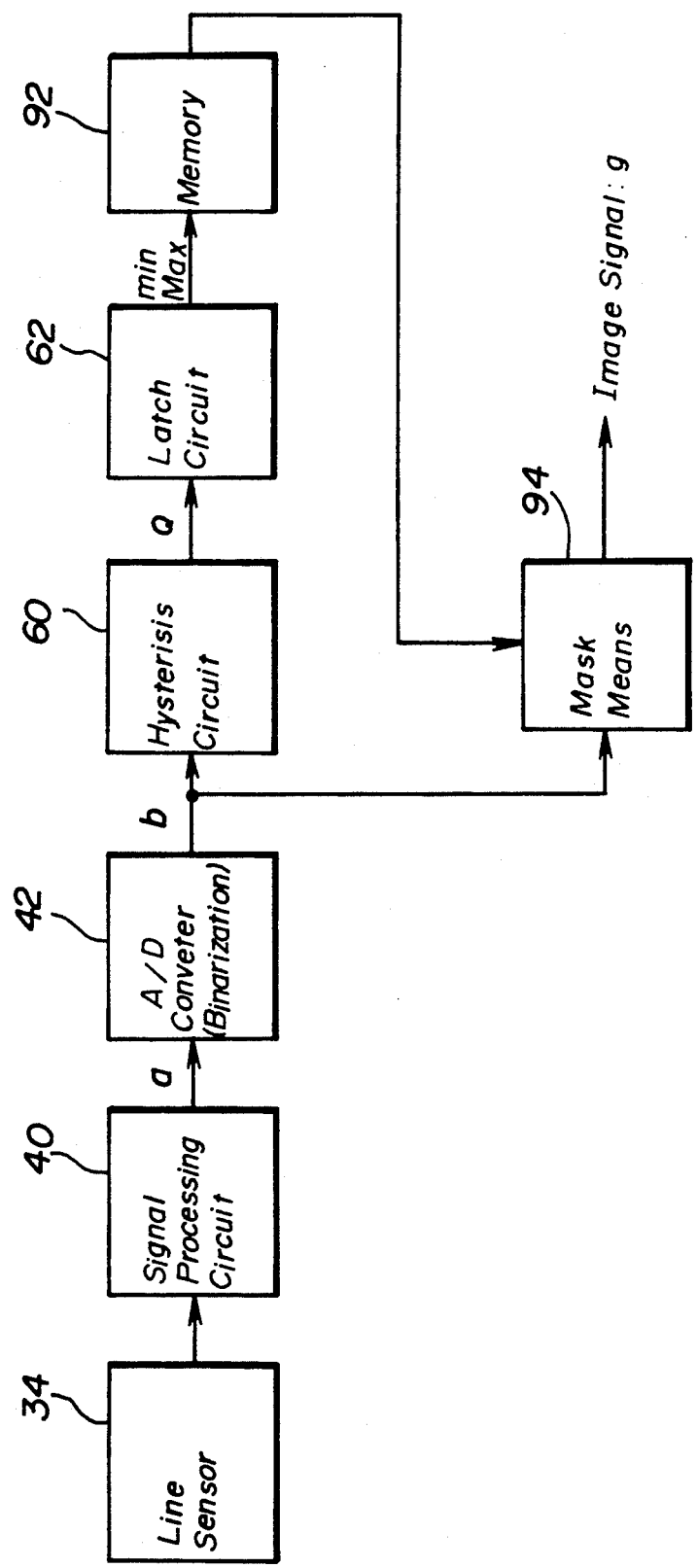
FIG. 2 is a block diagram showing the function of the present invention.
Figure 3:
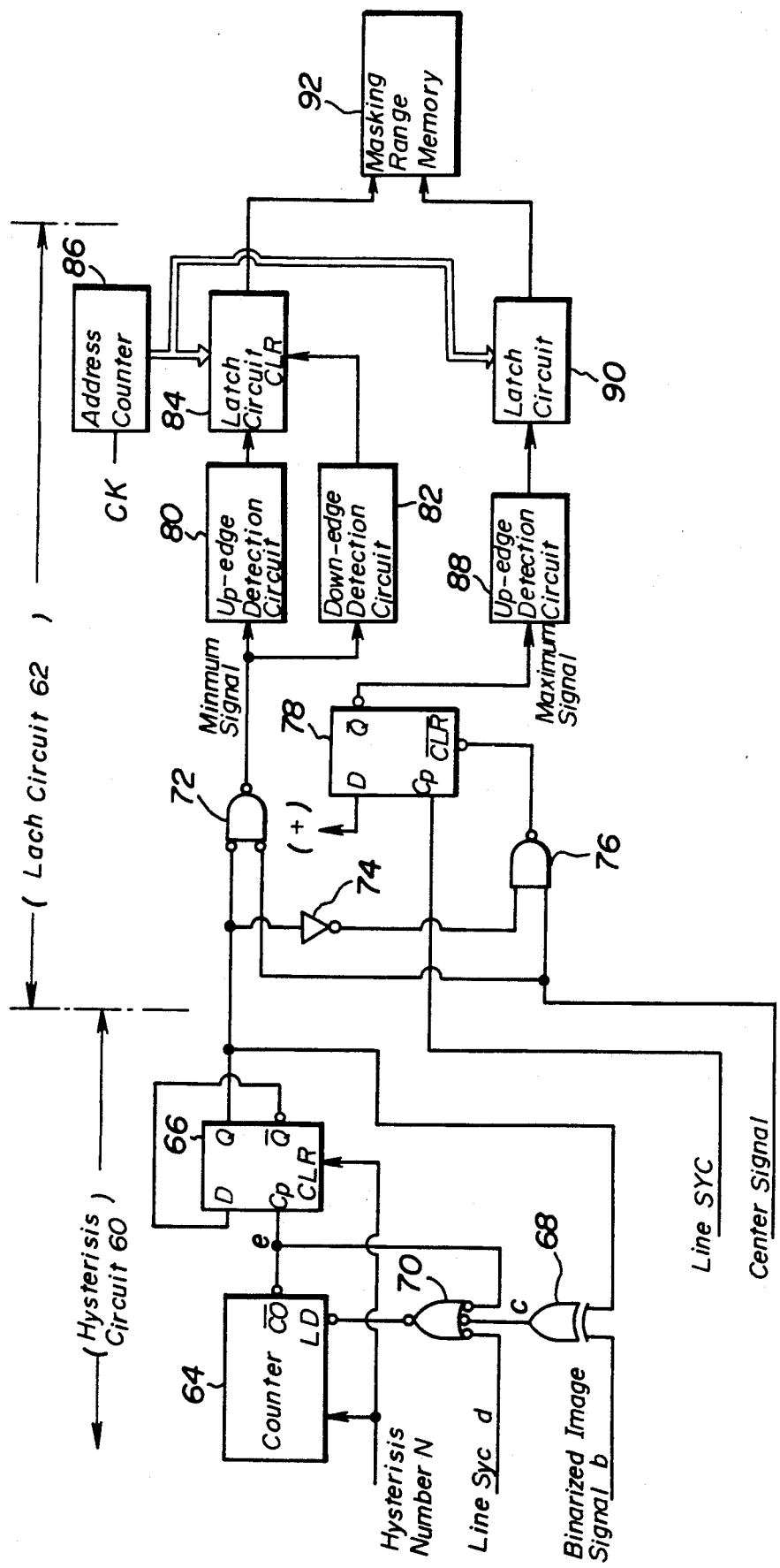
FIG. 3 is a block diagram showing the circuit assembled in the device of the invention.

Initially referring to FIG. 1, reference numeral 10 designates a frame of a microfilm, such as micro-fische or microfilm roll, bearing a positive image. A light is projected from a light source 12 and led through a condensor lens 14 to the underside of the film 10. The light transmitting through the film 10, i.e. the image projecting light, passes through a projector lens 16 and a reflector 18 to a transmission type screen 20 on which an enlarged projected image of the film is focused.

A mark 22 showing the focus zone is movable over the screen 20 and adjusted by means of a manually operated dial 24. The position of the focus zone is detected by a position detecting section 26 and the positional signal thus detected is fed to a control system 28.

A focus control lens 30 is provided to focus the enlarged image, and the image projecting light is partitioned by a half-mirror 32 disposed along the optical axis of the lens 32. A portion of the partitioned image projecting light passes through the lens 30 to a CCD line sensor 34 which serves as an image sensor. The line sensor 34 is movable along the direction perpendicular to the optical axis of the lens 30 by means of a motor 36. The lens 30 has a focal length so that the image is precisely focused on the light receiving surface of the line sensor 34 when the projector lens 16 is moved to a position to focus the image projecting light on the screen 20.

The projector lens 16 is moved by a servo motor 38 along the optical axis in response to the instruction from the control system 28 so that the image projecting light is precisely focused on the screen 20.

The line sensor 34 is driven by a CCD driver (not shown) in synchronism with clock pulses fed from a clock (not shown) to put out pulse voltages which are varied depending on the incident light quantities of respective picture elements during each scanning operation. The pulse voltages are fluctuated for respective picture elements due to fluctuation in characteristics of respective picture elements even when a constant light quantity is supplied from the light source 12. The signal processing circuit 40 compensates the fluctuation in characteristics of respective picture elements to shape the wave forms so that an output signal a is fed from the signal processing circuit 40.

The thus processed output signal a is converted into a binary image signal b by an A/D converter 42 and fed to the control system 28.

The control system 28 comprises an input interface 44, a CPU 46, an output interface 48, a ROM 50 and a RAM 52. The ROM 50 stores a control program for controlling the CPU 46. The control system 28 further comprises a printer 54, an optical disk 56 serving as an external memory and a keyboard 58.

The image signal b is fed through a hysteresis circuit 60 as an image area detecting circuit and a latch circuit 62 to the CPU 46. These circuits 60 and 62 are provided to determine the image area which contains a pre-set position.

The hysteresis circuit 60 detects plural image areas, i.e. the designated image area and other image areas such as an image area containing a blip mark, from the marginal portions of the frame, and removes various signals derived from letters and pictures in respective image areas and also removes electric noises derived from scratches, scars or dust on the film surface. The hysteresis circuit 60 comprises a subtraction counter 64, a T-flip-flop (T-FF) 66, an exclusive OR (EX-OR) 68 and a negative AND 70. T-FF 66 is formed by connecting the $\bar{Q}$ output from an delay flip-flop (D-FF) to the D input terminal to convert the same into a trigger (toggle) flip-flop (T-FF). As a trigger pulse of $C_p$ indicating the up-edge of the clock pulse $C_p$ is fed to the T-FF 66, the output Q is reversed. A hysteresis number N is set in the counter 64 at the time of initiating the operation, and the T-FF 66 is initialized simultaneously so that the output Q is set to "0" (black).

The output c from the EX-OR 68 takes the value "0" when the two inputs agree with each other, and takes the value "1" when the two inputs disagree with each other, so that agreement or disagreement of the two inputs is discriminated by the EX-OR 68.

The AND circuit 70 receives a line syc (synclo) signal d which takes the value "1" only within the effective read range in each scanning operation along the main scanning direction of the line sensor 34, the output c from the EX-OR 68 and an $\overline{co}$ ouput e from the counter 64. When all of these outputs d, c and e take the value "1", an LD (load) signal f, which takes the value "1", is fed from the AND circuit 70. The counter 64 counts the times n at which reverse signals f indicating reversing of the LD signal f are generated, and converts the $\overline{co}$ output e from "1" to "0" for a certain time period after the times n reach the hysteresis number N. The output e is set to "1" by initialization.

Accordingly, as the signal b takes the value "0" (at this time the output c takes the value "1") and the line syc takes the value "1" after the Q output from the T-FF 66 is set to "0" (indicating a white image) by initialization, the number n counted by the counter 64 is increased. This operation is repeated at a certain time interval, so that the $\overline{co}$ output e takes the value "0" for a certain time period after the time at which n=N. The output is fed as the clock pule $C_p$ which maintains the output Q from the T-FF at the value "0".

Figure 5:
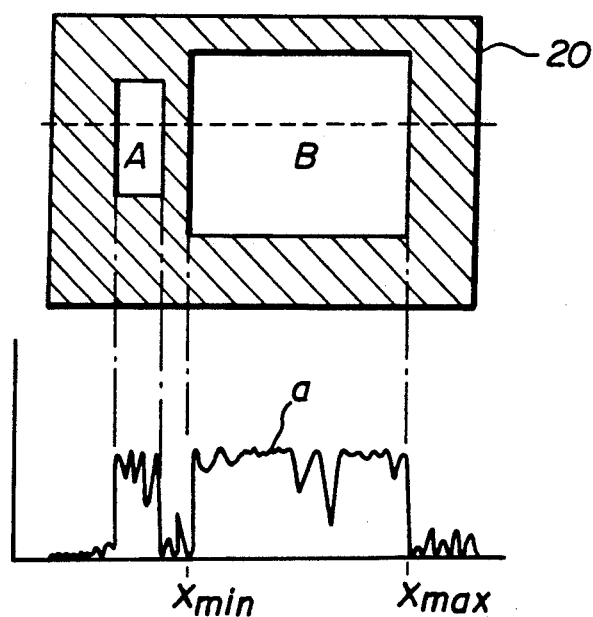
FIG. 5 is a diagram showing the image area and corresponding wave forms contained in the output signals obtained by scanning a frame of a microfilm.
Figure 6B:
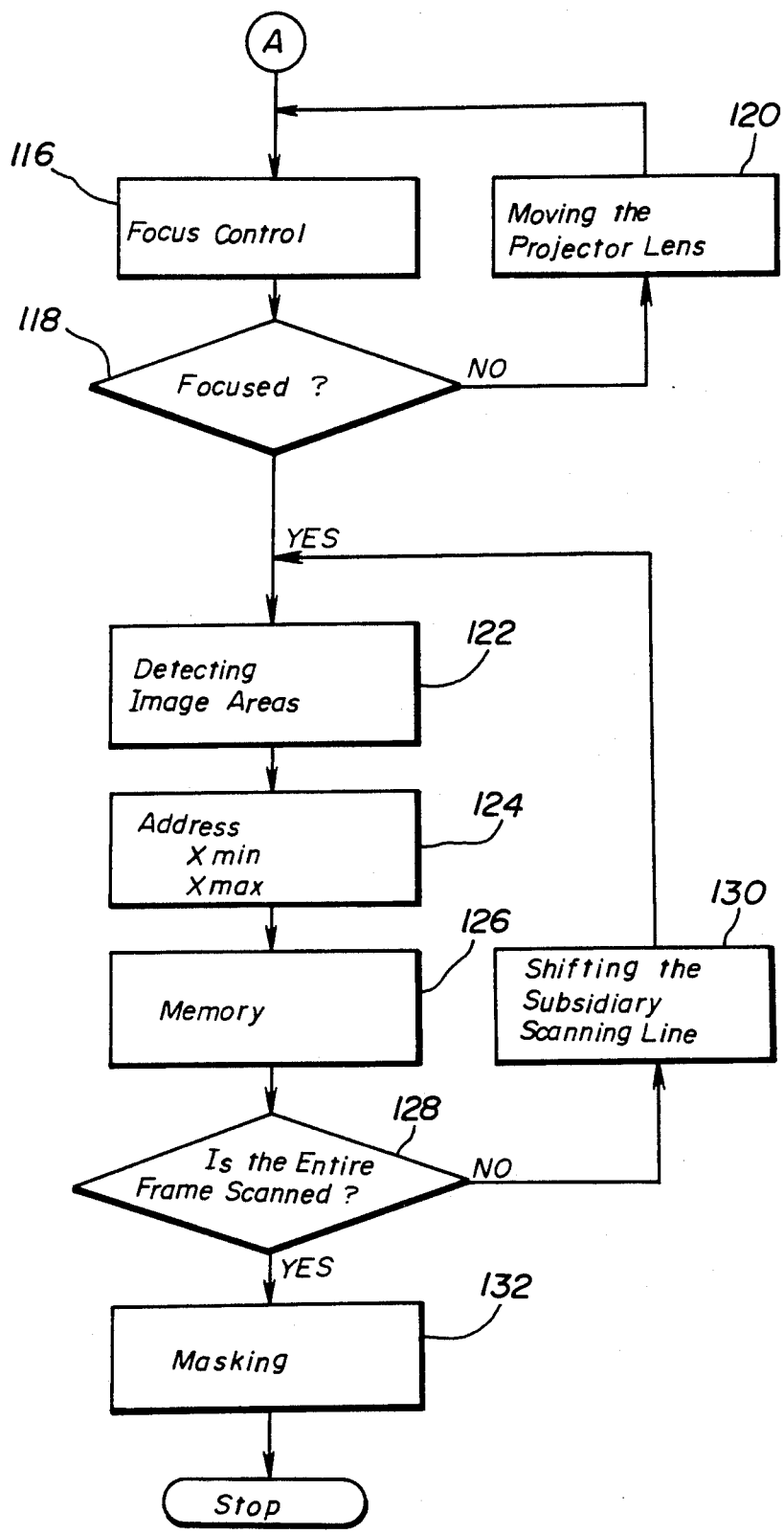

When the image signal b takes the value "1" (indicating black image) successively for N times, the output e from the counter 64 puts out clock pulse $C_p$ taking the value "0", whereupon the Q output from the T-FF 66 is reversed to "1" (indicating black image). When the image signal b takes the value "0" or "1" successively for N times, the Q output is reversed. As a result, the Q output which is the output from the hysteresis circuit 60 takes the value "1" within the image areas A and B shown in FIG. 5 and takes the value "0" within the marginal portions other than the image areas A and B. Thus, the image areas A and B are detected distinctively from the marginal portions. Simultaneously, unnecessary signals, such as signals derived from letters, pictures, scratches, scars or dust in respective image areas are removed so that smooth wave forms are obtained as shown in FIG. 5.

Figure 4:
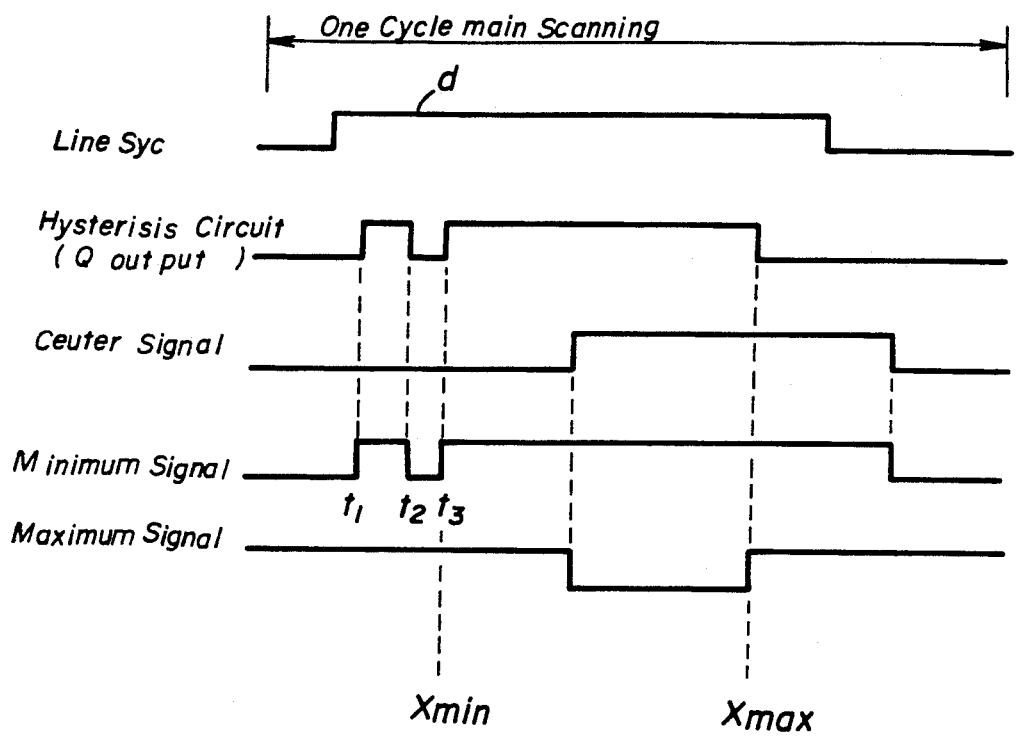
FIG. 4 is a chart showing the waveforms put out from respective sections of the device of the invention.

The latch circuit 62 selects only the image area B containing the designated position from the image areas A and B determined by the Q output from the hysteresis circuit 60. The circuit 62 comprises a negative logical circuit OR 72, a NOT 74, a NAND 76 and a D-FF 78 to obtain a minimum signal and a maximum signal for detecting the addresses which defines the image area. In this embodiment, the center signal which rises up at the center of the main scanning direction is used for determining the image range to be read by the line sensor 34. The center signal and the aforementioned Q output are fed into the OR 72 which generates an output corresponding to the minimum signal shown in FIG. 4. The up-edge and down-edge of the minimum signal are detected, respectively, by an up-edge detection circuit 80 and a down-edge detection circuit 82, and the outputs from these detection circuits 80 and 82 indicate the clear timing and the latch timing of the latch circuit 84, respectively. In detail, the scanned position along the main scanning direction is monitored by an address counter 86 and the content of the address counter 86 is transferred to the latch circuit 84 at the time corresponding to the up-edge of the minimum signal and then cleared at the time corresponding to the down-edge of the minimum signal. Accordingly, the address stored at the timing $t_1$ in FIG. 4 is cleared at the timing $t_2$, and then a new address is stored at the timing $t_3$. As the result, the address $X_{min}$ indicating the beginning of the designated image area B during the main scanning operation is stored in the latch circuit 84.

A maximum signal is extracted from the $\bar{Q}$ output from the D-FF having its D input terminal connected to (+). The $\bar{Q}$ output is set to "1" by initialization, and when the line syc fed as the clock pulse $C_p$ takes the value "1" the D input is put out from Q so that the $\bar{Q}$ output takes the value "0". The D-FF 78 is cleared when both of the reverse signal of the Q output (i.e. the output from the NOT 74) and the center signal take the value "1" to return the $\bar{Q}$ output to "1". As the result, the up-edge of the maximum signal indicates the terminal end of the image area B, and the up-edge is detected by a detection circuit 88 and the address $X_{max}$ corresponding to the up-edge is stored in the latch circuit 90. After the completion of scaning along the main scanning direction, the data in the latch circuits 84 and 90 are stored in the memory 92. The memory 92 may be the RAM 52.

The aforementioned operations are repeated along the subsidiary scanning direction to cover the entire image area to store the addresses indicating the periphery of the image area B. The CPU 46 reads the entire frame again and the unnecessary areas including the marginal portions are excluded as the areas which need not be read by the line sensor 34. The image area B is extracted. The operation for excluding the unnecessary areas is done by a mask means 94 shown in FIG. 2.

The operations of this embodiment will now be described. When the user selects the reader mode by operating the keyboard 58, the image on the film 10 is projected on the screen 20 (Step 100). A portion of the image projecting light is reflected by the half-mirror 32 to be passed to the line sensor 34. The control system 28 senses the focus zone set by the focus zone setting dial 24 and controls the servo motor 36 such that the image projecting light in the focus zone is incident on the line sensor 34.

The control system 28 is operated in accordance with the program stored in the ROM 50.

Initially, the control system 28 reads the binary signal b obtained by binarizing the output a from the line sensor 34 (Step 102), and then determines the exposure light quantity (Step 104). When the CPU 46 judges that the exposure light quantity of the output a is not optimum (step 106), the light quantity is changed (Step 108) followed by re-determination of the exposure light quantity. The exposure light quantity may be adjusted, for example, by adjusting the light quantity projected from the light source 12 so that the voltage indicating the picture element of the background region agrees with a predetermined voltage.

Then, the control system 28 judges whether the projecting light incident on the line sensor 34 contains a proper image or not (Step 110). The presence or absence of an image is judged, for example, by comparing the output signal b with a binary level to judge that an image is present when the output signal b changes from the value smaller than the binary level to the value greater than the binary level, and vice versa, at a frequency beyond the predetermined times, namely the times of reversing of the output signal b from white to black images and black to white images exceed the predetermined times. If the times of reversing of the image signal from black to white images and from white to black images are below the predetermined times, the CPU 46 judges that no proper image is present in the focus zone and generates a warning signal, for example, by a buzzer or lamp to request that the focus zone be shifted (Step 112). The user operates the dial 24 while observing the screen 20 to move the mark 22 to a position on which another projected image is present. The CPU 46 moves the line sensor 34 so that the line sensor 34 scans the new area to repeat the operations beginning from the Step 102 (Step 114). When the times of reversing of the image signal are larger than the predetermined times, it is judged that a proper image is present in the scanned area and the CPU 46 instructs that the auto-focusing control takes place (Step 116).

Various operations may be adopted for the auto-focusing control. For example, the position of the projector lens 16, where the contrast of the image takes the maximum value, is determined by referring to the output signal b to find out that the position is the focused position (Steps 118 and 120).

Under this focused condition, the motor 36 is actuated in response to the instruction from the CPU 46 to allow the line sensor 34 to scan the entire image area. The masked region may be determined as follows.

In this embodiment, the line sensor 34 is disposed along the horizontal direction (X direction; main scanning direction) on the screen 20 as shown in FIG. 5, and moved from the top to the bottom (Y direction., subsidiary scanning direction). The line sensor 34 scans from the left to the right along the top edge of the screen 20, and the output therefrom is passed through the image processing circuit 40 and the A/D converter 42 to be binarized. The binarized signal b is passed through the hysteresis circuit 60 where the signals derived from letters, pictures, drawings, scratches, etc. in respective image areas are removed to obtain smooth wave forms indicating the image areas A and B (Step 122), and then the addresses $X_{min}$ and $X_{max}$ indicating the beginning and terminating ends of the designated image area B determined by the latch circuit 62 are found (Step 124). These addresses are stored in the memory 92 (Step 126). The aforementioned operations are repeated while moving the line sensor 34 along the subsidiary scanning direction, whereby the addresses defining the periphery of the image area B are stored (Steps 128 and 130).

After the addresses defining the periphery of the image area B are found by the first scanning, the CPU 46 instructed to scan the same frame again so that the signals b obtained by scanning the areas other than the image area B are converted into white signals by the mask means 94. The output obtained by the second scanning is used as a new image signal g (Step 132). The new image signal g is stored in the photo-disk means 56 or other memory means, or fed to the printer 54 to reproduce a hard copy as desired.

In the illustrated embodiment, the image is read by the line sensor 34 to detect the image area B, and then the image is again read by the line sensor 34 to obtain the image signals within the image area B. Accordingly, a large capacity memory for storing the data of each frame, such as a frame memory, is not necessary. However, within the scope of this invention, a frame memory 53 may be incorporated as shown by the dots-and-dash line in FIG. 1 so that the image is read from the thus stored memory to determine the image area B and then the signals deprived of the unnecessary portions from the stored memory are stored again.

Although the area to be read has been designated by referring to the center signal in the illustrated embodiment, the area to be read may be designated by the instructions fed through the keyboard. For example, an input signal indicating an arbitrary position on co-ordinates within the area to be designated may be fed through the keyboard to read only the area containing the indicated position on the co-ordinates.

The image sensor is not limited only to the CCD line sensor, and may be replaced by a MOS type line sensor or an area sensor.

According to the first aspect of the invention, the output signal from the image sensor is processed to detect plural image areas in the frame and then only the image area containing the designated position is extracted to find out the addresses defining the designated image area. Accordingly, the unnecessary portions including the marginal portions of the frame are excluded during the subsequent image reading operation by a simple operation.

A device for realizing the method of the invention is also provided.

What is claimed is:

1. A method of detecting a desired image area from plural image areas included in a frame of a microfilm which is read by an image sensor through scanning operations, said frame being defined by plural address-identified positions, comprising the steps of:

designating only a desired one of said plural image areas as a designated image area by a respective pre-set address-identified position;

detecting said plural image areas from marginal portions of the frame; extracting the designated image area which contains said respective pre-set address-identified position in the frame; and obtaining and storing the addresses which define the periphery of said designated image area.

2. The method of claim 1, wherein said pre-set position in the frame is the center of the frame.

3. An image processor for selecting and reading a designated image area as a desired image area from plural image areas included in a frame of a microfilm through scanning operations, said processor comprising:
- image sensor means for scanning said frame including said plural image areas;
- image area detecting circuit means for detecting said plural image areas from marginal portions of said frame;
- a latch circuit for determining only a single designated image area, including a pre-set position in the frame, from said plural image areas as said desired image area;
- memory means for storing an address of the periphery of said designated image area; and
- mask means for extracting the designated image area defined by said address.

4. The image processor of claim 3, wherein said image sensor means is a line sensor means for scanning said plural image areas a line at a time and for generating digital scan signals, each line being scanned during a first and second scan, the digital scan signals from said first scan being used for determining said designated image area, and the digital scan signals from said second scan being used to read the designated image area as the desired image area.

5. The image processor of claim 3, wherein said image area detecting circuit means is a hysteresis circuit.

6. The method of claim 1, wherein an image area is detected by a line sensor, and then the image area is scanned again by said line sensor to read the image.

* * * * *